(12) United States Patent
Fujimura et al.

(10) Patent No.: US 7,517,158 B2
(45) Date of Patent: Apr. 14, 2009

(54) METHOD FOR MANUFACTURING AN OPTICAL MODULE

(75) Inventors: Yasushi Fujimura, Kanagawa (JP); Tomoya Saeki, Kanagawa (JP); Yasunori Michitsuji, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/806,263

(22) Filed: May 30, 2007

(65) Prior Publication Data
US 2007/0280602 A1 Dec. 6, 2007

(30) Foreign Application Priority Data
May 31, 2006 (JP) .............................. 2006-151966

(51) Int. Cl.
*G02B 6/36* (2006.01)
*G02B 6/42* (2006.01)
(52) U.S. Cl. .............................. 385/88; 385/90; 385/93
(58) Field of Classification Search ................ None
See application file for complete search history.

(56) References Cited

U.S. PATENT DOCUMENTS

| 5,347,604 A | * | 9/1994 | Go et al. ........................ 385/92 |
| 5,666,450 A | * | 9/1997 | Fujimura et al. ............... 385/93 |
| 5,963,696 A | * | 10/1999 | Yoshida et al. ................ 385/91 |
| 7,325,984 B2 | * | 2/2008 | Nakanishi et al. ............. 385/93 |

* cited by examiner

*Primary Examiner*—Omar Rojas
(74) *Attorney, Agent, or Firm*—Venable LLP; Michael A. Sartori; Steven J. Schwarz

(57) ABSTRACT

The invention provides a method for manufacturing a optical subassembly even when the assembly involves the positional deviation of the components that induces the discrepancy in the direction of the optical output beam from the optical device. The method first determines the position $(x_1, y_1, z_1)$ of the stub where the optical coupling between the stub and the optical device becomes the maximum. Next, the direction of the optical output beam from the optical device is calculated based on the position above, and, finally, the inclined direction of the end surface of the stub is aligned with the direction of the optical output beam evaluated in the previous step.

6 Claims, 6 Drawing Sheets

METHOD FOR MANUFACTURING AN OPTICAL MODULE

BACKGROUND OF THE INVENTION

1. Field of the Invention

The present invention relates to a method for manufacturing an optical module, where the optical module provides an optical device with a semiconductor laser diode and a lens for concentrating the light output from the laser diode. In particular, the method relates to optically coupling the optical device with a stub including a coupling fiber whose end surface facing the lens is inclined with respect to the optical axis of the coupling fiber.

2. Related Prior Arts

For the optical module that combines the optical device including the semiconductor optical device and the lens with the optical receptacle that includes a sleeve and a stub, an optical alignment between the optical device and the optical receptacle is inevitable, because a misaligned module with an inferior optical coupling therebetween degrades the signal-to-noise ratio to shorten the transmission range.

The U.S. Pat. No. 5,963,696 has disclosed a method for optically aligning the optical receptacle with the optical device. That is, the method disclosed therein first calculates an optimum incident angle α for the inclined angle θ of the tip surface of the coupling fiber. Next, assuming the gap between the lens and the LD to be a, the displacement $x_0$ is calculated as $x_0 = a \cdot \tan(\alpha)$. Subsequently, the LD chip is mounted on the package so as to target a position displaced by $x_0$ from the center S of the package, while the lens is mounted on the package so as to align the center of the lens with respect to the center of the package. Finally, the process fixes the optical fiber as aligning the direction of the inclined end surface thereof with the direction of the displacement and obtaining a position where the maximum coupling efficiency is realized by sliding the optical receptacle within a plane perpendicular to the optical axis.

The LD module, which is often called as a transmitter optical sub-assembly (TOSA), generally integrates a stub with an inclined end surface by 6° to 8° to the optical axis to eliminate the light returning the LD. On the other hand, it is necessary for optically coupling the light output from the optical device with a good coupling efficiency to incline the optical axis of the light with respect to the axis of the stub. This peculiar configuration between the optical receptacle and the optical device may be realized, for example, by assembling the LD chip as inclining the axis thereof, or by offsetting the lens in horizontally, namely, perpendicular to the optical axis, with respect to the LD.

Thus, it is necessary for the optical alignment between the optical receptacle with the stub and the optical device to align the inclined direction of the end surface of the stub with the direction of the light beam from the optical device, which is inevitable to realize the optimum optical coupling therebetween and the superior performance for the wiggle characteristic, where the wiggle is the fluctuation of the optical coupling efficiency depending of the suspended state of the optical fiber.

Conventionally, the direction of the light beam output from the optical device was determined primarily based on the designed displacement between the LD and the center of the lens. However, the manufacturing process inevitably involves a substantial tolerance in physical dimensions of components and the positional accuracy thereof. Thus, the direction of the light beam output from the optical device strongly depends on the relative position of the lens to the LD. Paradoxically, to control the relative position of the lens to the LD may adjust the direction and the angle of the output beam from the optical device.

However, it is practically hard to control the relative position of the lens to the LD, that is, to suppress the positional deviation of the lens from the designed point within a desired range. The current assembling process using the image recognition technique for the LD chip realizes the positional deviation of the chip within a desired range. The aligning process for the lens with respect to the lens holder also realizes the deviation within an acceptable range. However, the welding of the lens holder to the stem of the package involves the positional deviation of about thirty and forty micron meters. In addition to this positional deviation of the lens holder, the misalignment and the inclination of the LD chip, and the inclination of the sub-mount may also generate the discrepancy between the practical direction and the designed direction of the optical output from the optical device. Accordingly, the direction of the output beam from the optical device scatters from 90° to 120°.

Thus, the present invention is to provide a method for manufacturing an optical module even when the components therein involves the positional deviation and the optical output appears an inconsistent direction with the designed parameter.

SUMMARY OF THE INVENTION

A method according to the present invention is for an optical module that comprises an optical device and an optical receptacle. The optical device includes a semiconductor laser diode to emit light and a lens for concentrating the light from the laser diode. The optical receptacle includes a stub with a coupling fiber in a center thereof. The stub together with the coupling fiber provides a surface to receive the concentrated light from the lens, and the surface is inclined with respect to an optical axis of the coupling fiber to suppress the light from being reflected to the incoming direction.

The method of the invention comprises steps of: (a) determining a position where the maximum coupling efficiency between the optical device and the stub is realized, (b) estimating a direction of the light output from the optical device, and (c) aligning a direction of the inclined surface of the stub with the direction of the light output from the optical device.

Because the method determines the direction of the optical output from the optical device after the completion of the device, and the inclined direction of the end surface of the stub is aligned with this direction of the output beam from the optical device, the optical coupling efficient between the optical device and the optical receptacle may become maximum independent of the positional displacement if the lens holder to the laser diode induced in the assembly process.

The method may apply a position sensing device (PSD) for determining the position where the maximum optical coupling is realized, and calculates this position by the result sensed by the PSD. The method using the PSD may shorten the setup time for determining the position where the maximum optical coupling is obtained.

DESCRIPTION OF PREFERRED EMBODIMENTS

Next, preferred embodiments of the present invention will be described as referring to accompanying drawings. In the description of drawings, the same symbols or numerals will refer to the same elements without overlapping explanations.

Figure 1:
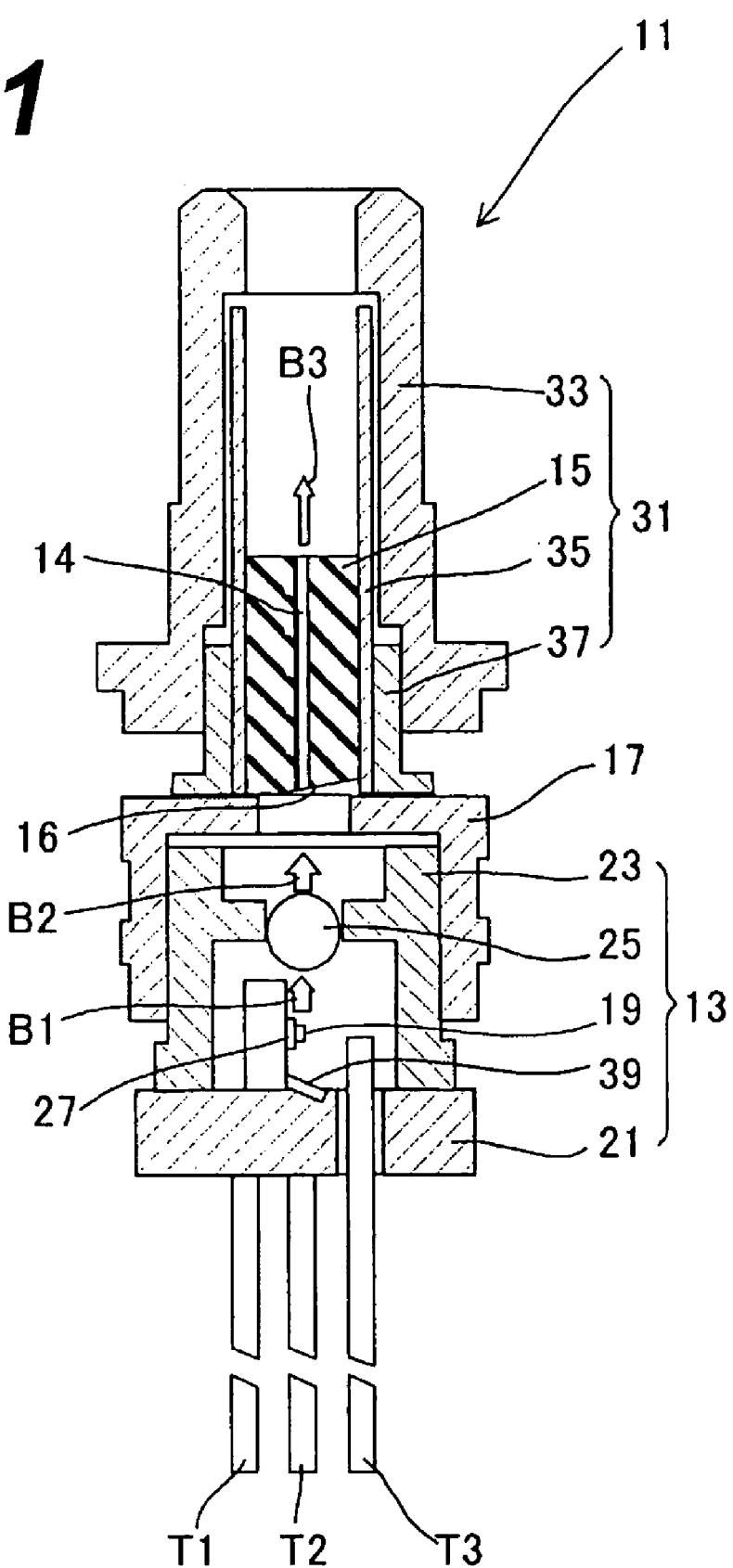
FIG. 1 is a cross section view showing the optical module according to the present invention.

FIG. 1 is a cross section of an optical module according to the present invention. The optical module 11 comprises an optical device 13, an optical receptacle 31 and a joint holder 17 physically connecting the optical device 13 with the optical receptacle 31. The optical device 13 includes a semiconductor optical device 19 such as semiconductor laser diode (LD) mounted on a sub-mount 27, a lens 25 supported by a lens holder 23 and a photodiode (PD) 39 for monitoring a portion of light output from the LD 19. In this embodiment, the lens 25 is a type of a spherical lens. The lens holder 23 is welded on a stem 21 of the optical device 13. The optical device 13 further provides a plurality of lead pins, T1 to T3, to carry an electrical signal and a power supply for the LD 19. In FIG. 1, a symbol B1 denotes laser light output from the front facet of the LD 19, while, another symbol B2 denotes light passing through the lens 25. The optical receptacle 31 includes a stub 15 that secures a coupling fiber 14 in a center thereof, a sleeve cover 33, a sleeve 35 and a bush 37. The bush 37 is welded, in a bottom surface thereof, on the top surface of the joint holder 17. The stub 15 with the tip of the coupling fiber 14 has an end surface inclined with respect to an optical axis of the coupling fiber, which faces the joint holder 17 and prevents the light B2 from returning the LD 19. In FIG. 1, the symbol B3 denotes light output from the tip of the coupling fiber 14.

Figure 2:
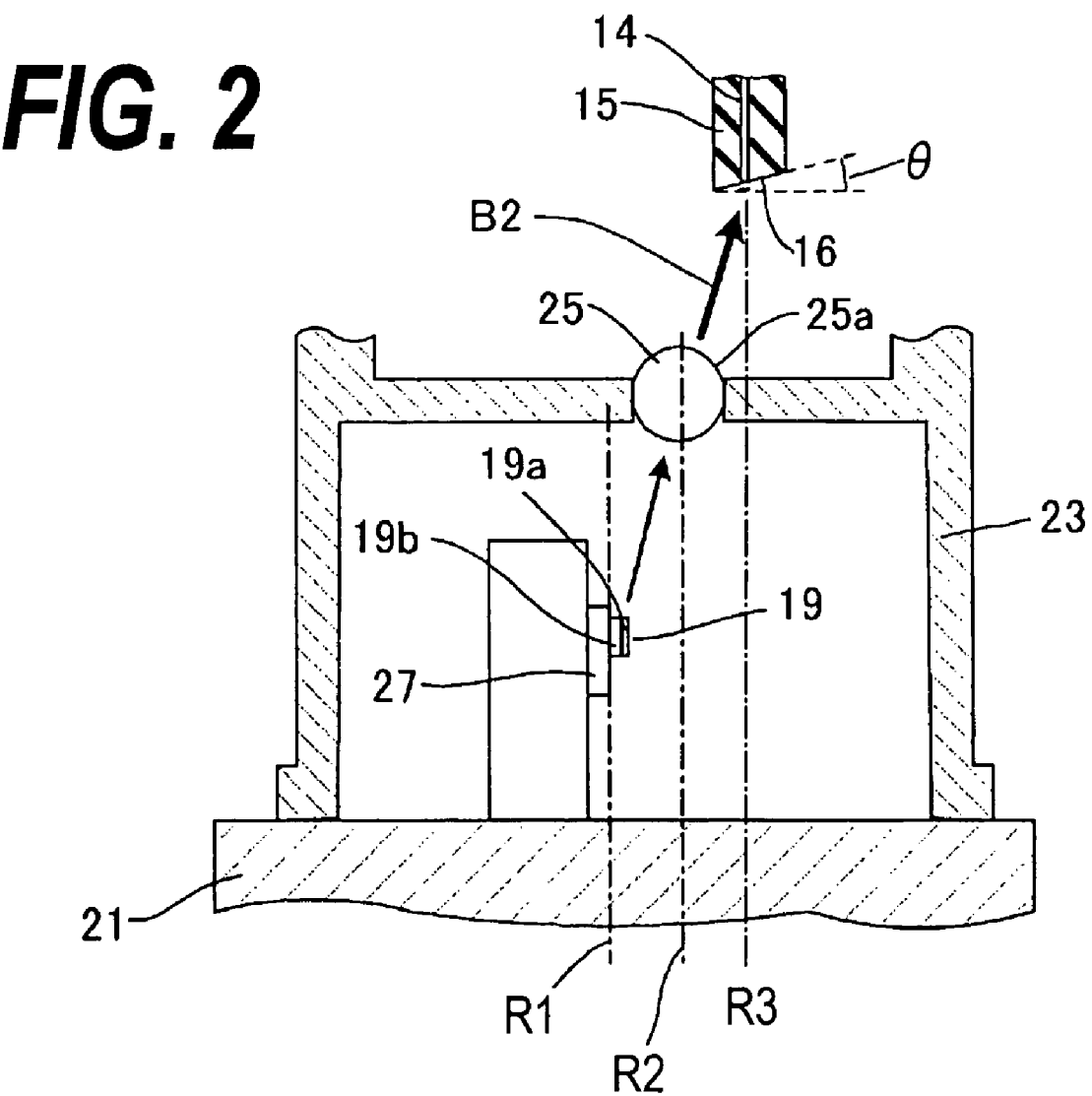
FIG. 2 explains a positional relation between the laser diode, the lens, and the tip of the coupling fiber for the optical coupling of the optical device with the optical receptacle.

FIG. 2 explains an optical system of the optical module 11 shown in FIG. 1, which illustrates the positional relation between the LD 19, the lens 25 and the stub 15, exactly the coupling fiber 14. The LD 19 includes an active layer 19$a$ for emitting the laser light B1, where the laser 19 is mounted on a surface 19$b$ of the sub-mount 27. As shown in FIG. 2, the vertical position of the LD 19, which is denoted as R1 in FIG. 2, the center of the lens 25 denoted as R2 and the optical axis of the coupling fiber 14 denoted as R3 are shifted to each other. Further, the end surface 16 of the stub 15, with the tip of the coupling fiber 14, is inclined by an angle θ with respect to the optical axis of the coupling fiber 14.

As for the dimensional accuracy of the optical module 11, the LD 19 is mounted on the sub-mount 27 and the sub-mount 27 is fixed to the stem 21 with enough accuracy. The lens 25 is also held by the lens holder 23 with enough accuracy. However, the lens holder 23 is fixed to the stem 21 by the welding with substantial tolerance of some thirty or forty micron meters. Accordingly, the direction of the light B2 passing through the lens 25 may be widely scattered.

A conventional optical module decided the position of the stub 15 and the end surface 16 thereof based only on the designed parameter, which degraded not only the optical coupling efficiency between the LD 19 and the coupling fiber 14 but also the wiggle characteristic, which is the fluctuation of the optical coupling efficiency when the fiber receives a suspensory stress. On the other hand, the present optical module 11 determines the position of the stub 15, namely, the position of the coupling fiber, after welding the lens holder 23 to the stem 21 by practically operating the LD 19 and monitoring the light B2 passing through the lens 25.

Figure 3:
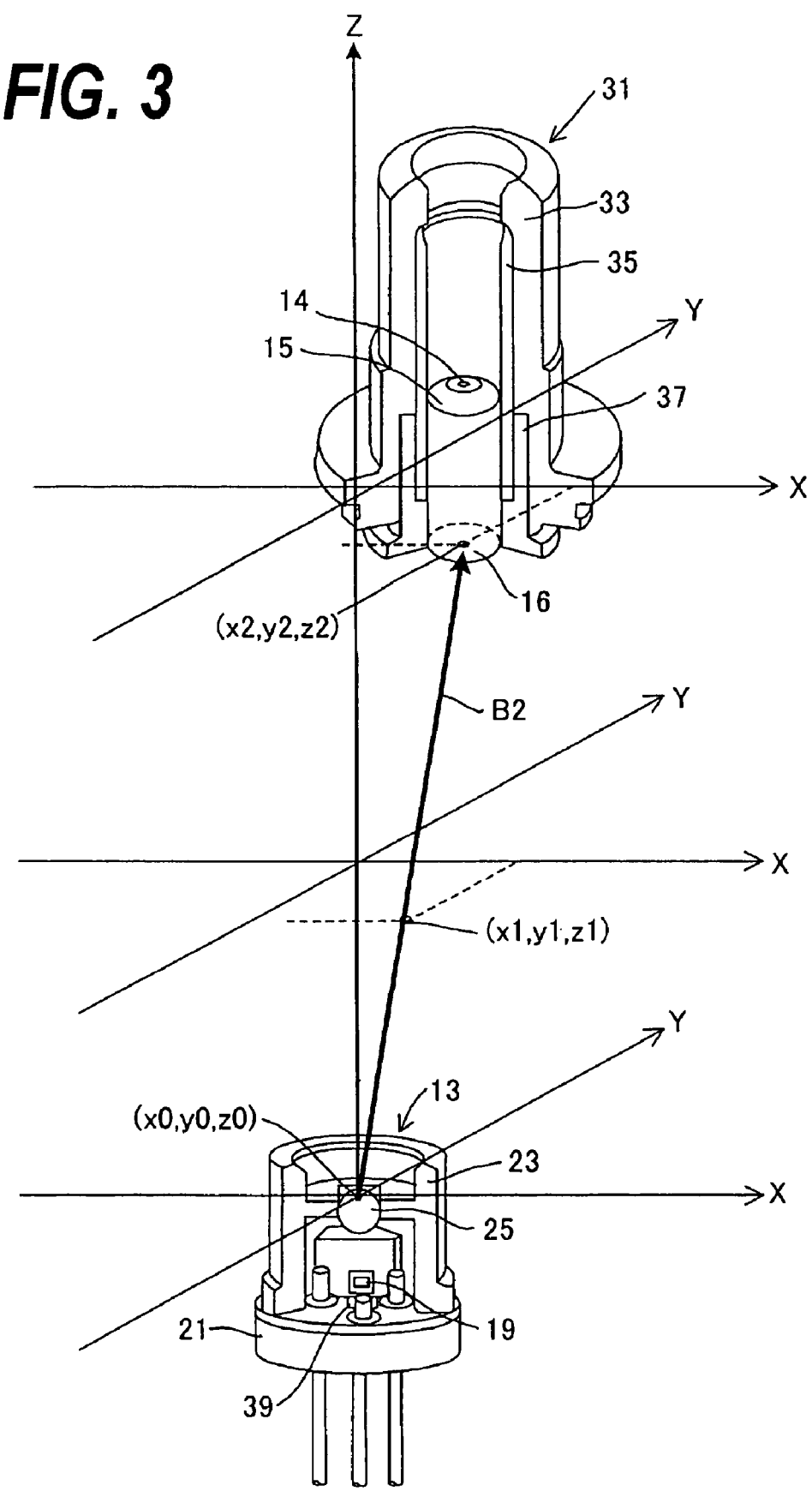
FIG. 3 illustrates a method for deciding the direction of the optical beam output from the optical device according to an embodiment of the present invention.

FIG. 3 explains the practical optical system of the module 11, in particular, FIG. 3 shows the trace of the light B2 passing through the lens 25. First, the origin ($X_0$, $Y_0$, $Z_0$) of the co-ordinate system is set in the center of the lens 25, which is common to the optical device 13 and to the optical receptacle 31. Next, by sliding the optical receptacle horizontally on an X-Y plane apart from the origin ($x_0$, $y_0$, $z_0$) along the z-axis, a position ($x_1$, $y_1$, $z_1$), which is the location of the tip 16 of the coupling fiber 14, is detected at which the intensity of the light beam B2 becomes maximum as practically operating the LD 19 and monitoring the intensity of the light output from the tip of the coupling fiber 14 opposite to the receiving tip 16 thereof. Based on a relative position between the detected point ($x_1$, $y_1$, $z_1$) and the origin ($x_0$, $y_0$, $z_0$) the propagating direction of the light beam B2 may be determined. More than single verification at the plane ($x_1$, $y_1$) may enhance the accuracy of the propagating angle of the laser beam B2, that is, the verification at the plane ($x_1$, $y_1$) and the other plane ($x_2$, $y_2$). The latter xy-plane is far apart from the origin ($x_0$, $y_0$, $z_0$) compared to the former xy-plane. Finally, by aligning the inclined direction of the end surface of the stub 15 together the tip of the coupling fiber 14, the optical receptacle 31 may be precisely aligned with the optical device 13.

Figure 4:
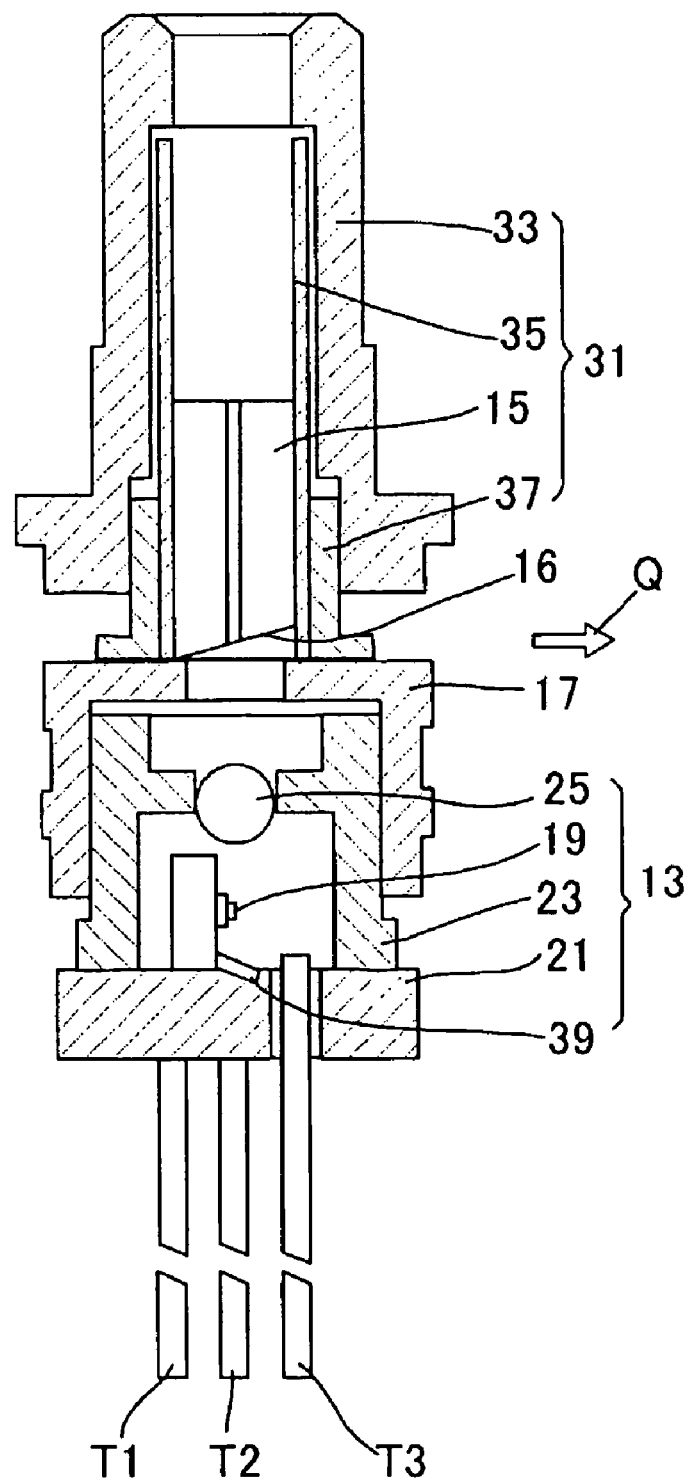
FIG. 4 illustrates the optical alignment between the optical receptacle and the optical device.

FIG. 4 is a cross section of the optical module 11 and illustrates the mechanism of the optical alignment between the optical receptacle 31 and the optical device 13. First, the inclined surface 16 of the stub 15 turns its direction, which is denoted by Q in FIG. 4. This direction may be obtained by the positions, ($x_0$, $y_0$, $z_0$) and ($x_1$, $y_1$, $z_1$), as explained in the previous drawings. Next, as aligning the inclined angle of the surface 16 with the direction Q, the optical receptacle 31 is slid on the top surface of the joint holder 17 and the joint holder 17 is slid along the optical axis on the outer surface of the optical device 13 to obtain a longitudinal position of the joint holder 17 and the horizontal position of the optical receptacle 31 where the maximum coupling efficiency between the optical receptacle 31 and the optical device may be obtained. Finally, the bush 37 in the optical receptacle 31 may be welded on the top surface of the joint holder 17, and the outer flange of the joint holder is welded to the side surface of the lens holder 23. Thus, the optical receptacle 31 may be optically aligned with the optical device 13.

The process to obtain the propagating direction of the light B2 in several xy-planes in order to enhance the accuracy of the alignment occasionally requires a lot of time. Then, a position sensing device (PSD) may be applicable without sliding the optical receptacle on a xy-plane. That is, a PSD made of GaInAs/InP based photodiode (PD) with a wide optically sensitive surface and plurality of photo-carrier correcting electrodes is used for the LD with the emission wavelength thereof within a region from 1.30 μm to 1.55 μm. Such a PSD is placed in front of the optical device 13 and receives the light beam B2. By differentiating the magnitude of the photo-carrier corrected by each electrode, the position of the light beam B2 may be estimated, which may determines the direction of the light beam B2.

Figure 5:
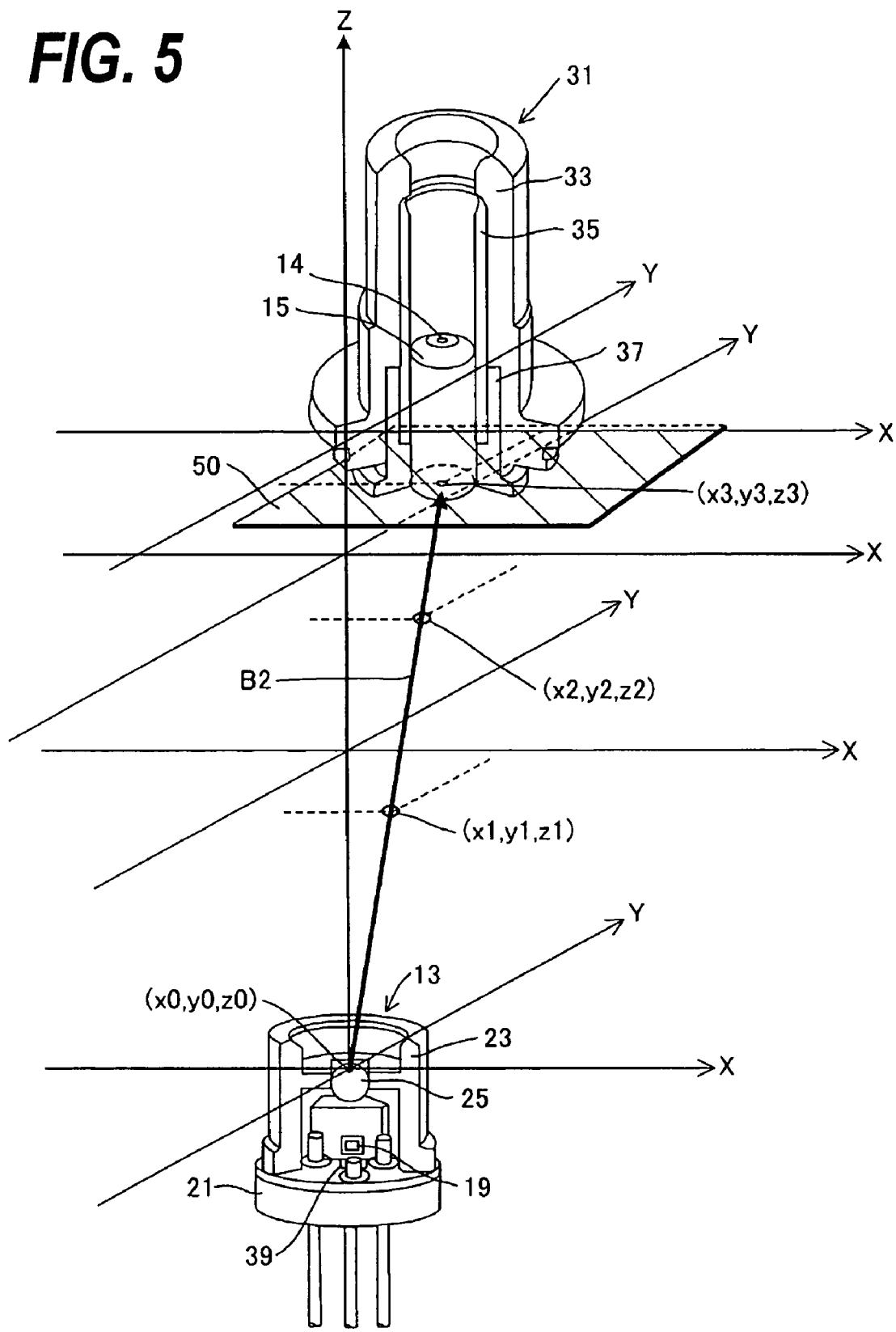
FIG. 5 explains another method for deciding the direction of the optical beam according to another embodiment of the present invention.
Figure 6:
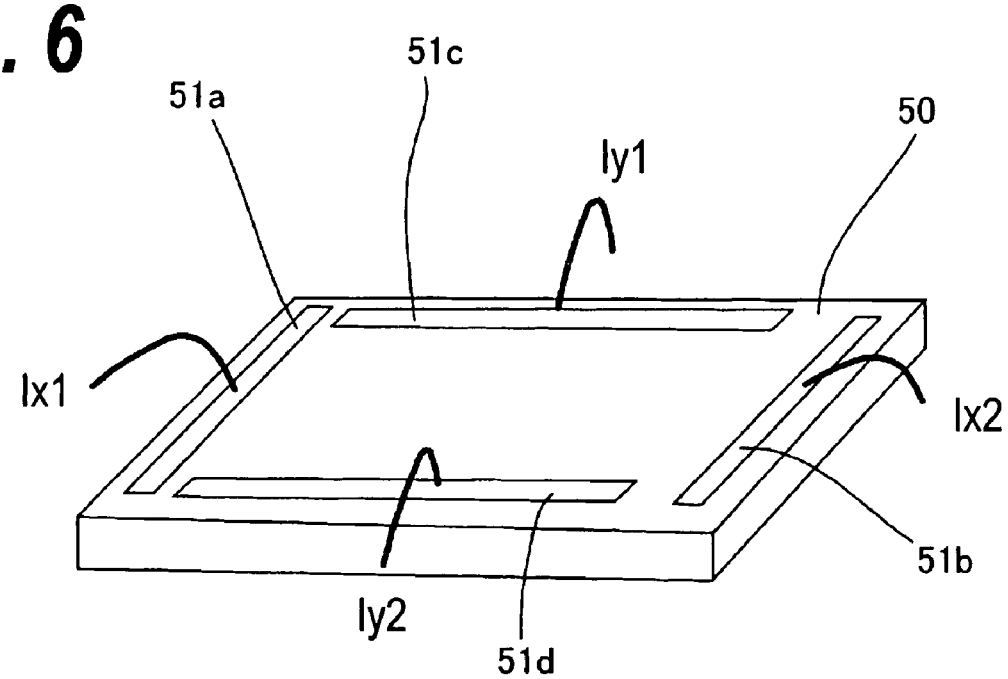
FIG. 6 illustrates the position sensing device applicable to the method shown in FIG. 5.

FIG. 5 explains the process for obtaining the direction of the beam B2 by using the PSD, and FIG. 6 describes the configuration of the PSD 50. Moving the PSD 50 along the z-direction as maintaining the angle of the primary surface thereof in substantially right angle with respect to the z-axis, the position of the light beam B2 at each level is calculated. Thus, the direction of the light beam B2 may be obtained, and the alignment process of the optical module 11 may set the optical receptacle 31 on the optical device 13 based on the direction of the light B2 thus determined.

As shown in FIG. 6, the PSD 50 is a type of photodiode with the wide optically sensitive surface. The PSD 50 provides a plurality of electrodes, four electrodes, 51a to 51d, arranged in respective sides in an example shown in FIG. 6. Assuming the photocurrent detected by respective electrodes to be $Ix_1$, $Ix_2$, $Iy_1$ and $Iy_2$, the position (x, y) of the optical beam within the sensing surface may be obtained by equations:

$$x = A \times (Ix_1 - Ix_2)/(Ix_1 + Ix_2)$$

$$y = B \times (Iy_1 - Iy_2)/(Iy_1 + Iy_2),$$

where A and B are correction factors, and the center of the optically sensing surface is origin. The trace of the light beam B2 using the PSD 50 may omit the sliding of the optical receptacle 31 in the xy-plane, which saves the process time even when the process increases the number of z-points where the evaluation of the light beam B2 is carried out. Moreover, the PSD 50 is a type of photodiode. Accordingly, the process may evaluate the field pattern and the optical output power of the light beam B2 that corresponds to the optical output from the LD 19.

What is claimed is:

1. A method for manufacturing an optical module comprising an optical device and an optical receptacle, the optical device including a semiconductor laser diode to emit light and a lens for concentrating the light emitted from the laser diode, the optical receptacle including a stub with a coupling fiber in a center thereof, the stub accompanied with the coupling fiber providing a surface to receive the concentrated light from the lens, the surface being inclined with respect to an optical axis of the coupling fiber, the method comprising steps of:
   (a) determining a position of the optical receptacle where an optical coupling efficiency between the optical device and the stub becomes maximum;
   (b) varying a distance between the optical device and the coupling fiber;
   (c) deciding a direction of the light output from the lens in the optical device by iterating the steps (a) and (b); and
   (d) aligning a direction of the inclined surface of the stub with the direction of the light output from the optical device.

2. The method according to claim 1,
   wherein the step for determining the position at which the optical coupling efficiency between the optical device and the stub becomes maximum includes steps of,
   sensing the light output from the optical device by a position sensing device, and
   calculating the position based on a sensed result.

3. The method according to claim 1,
   wherein the optical module further comprises a joint holder between the optical device and the optical receptacle, and
   wherein the method further comprises a step, after the step of the alignment of the direction of the inclined surface of the stub, for sliding the optical receptacle on the joint holder and sliding the joint holder along the optical axis so as to obtain a position where the maximum coupling efficiency is realized as maintaining the inclined direction of the end surface of the stub aligned with the direction of the light.

4. A method for manufacturing an optical module comprising an optical device and an optical receptacle, the optical device including a semiconductor laser diode to emit light and a lens for concentrating the light emitted from the laser diode, the optical receptacle including a stub with a coupling fiber in a center thereof, the stub accompanied with the coupling fiber providing a surface to receive the concentrated light from the lens, the surface being inclined with respect to an optical axis of the coupling fiber, the method comprising steps of:
   (a) assuming an origin of the light emitted from the laser diode as a center of the lens;
   (b) deciding a direction of the light output from the origin by practically sensing the light on a plane with a distance to the origin; and
   (c) aligning a direction of the inclined surface of the stub with the direction of the light output from the optical device.

5. The method according to claim 4,
   wherein the step for deciding the direction of the light includes steps for:
   sensing the light output from the optical device by a position sensing device, and
   calculating the position of the optical receptacle based on a sensed result.

6. The method according to claim 4,
   wherein the optical module further comprises a joint holder between the optical device and the optical receptacle, and
   wherein the method further comprises a step, after the step for aligning of the direction of the inclined surface of the stub, for sliding the optical receptacle on the joint holder and sliding the joint holder along the optical axis so as to obtain a position of the optical receptacle where the maximum coupling efficiency is realized as maintaining the inclined direction of the end surface of the stub aligned with the direction of the light.

* * * * *